United States Patent
Sawachi

(10) Patent No.: US 7,823,771 B2
(45) Date of Patent: Nov. 2, 2010

(54) MULTIPLEX INFORMATION CARD, IMAGE DATA INPUTTING EQUIPMENT AND METHOD, AND INFORMATION CARD ISSUING SYSTEM

(75) Inventor: Youichi Sawachi, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 779 days.

(21) Appl. No.: 11/090,832

(22) Filed: Mar. 28, 2005

(65) Prior Publication Data

US 2005/0211767 A1 Sep. 29, 2005

(30) Foreign Application Priority Data

Mar. 29, 2004 (JP) ............................. 2004-097056

(51) Int. Cl.
*G06K 5/00* (2006.01)
(52) U.S. Cl. .................... 235/380; 235/375; 235/451; 235/487; 235/492
(58) Field of Classification Search ................. 235/375, 235/380, 451, 487, 492
See application file for complete search history.

(56) References Cited

U.S. PATENT DOCUMENTS

| | | | |
|---|---|---|---|
| 4,887,161 A * | 12/1989 | Watanabe et al. | 348/231.7 |
| 5,130,813 A * | 7/1992 | Oie et al. | 386/77 |
| 5,276,311 A * | 1/1994 | Hennige | 235/380 |
| 5,777,903 A | 7/1998 | Piosenka et al. | |
| 5,884,271 A * | 3/1999 | Pitroda | 705/1 |
| 6,702,181 B2 * | 3/2004 | Ramachandran | 235/380 |
| 6,738,090 B2 * | 5/2004 | No et al. | 348/207.11 |
| 6,961,540 B1 * | 11/2005 | Kondoh | 455/41.2 |
| 2003/0052865 A1 * | 3/2003 | Miller | 345/173 |
| 2003/0086685 A1 * | 5/2003 | Bowden et al. | 386/46 |
| 2003/0163717 A1 * | 8/2003 | Yoshimoto et al. | 713/193 |
| 2004/0048503 A1 * | 3/2004 | Mills et al. | 439/76.1 |
| 2004/0153715 A1 * | 8/2004 | Spaeth et al. | 714/4 |
| 2005/0212944 A1 * | 9/2005 | Guy | 348/333.07 |

FOREIGN PATENT DOCUMENTS

| | | |
|---|---|---|
| JP | 10-283437 A | 10/1998 |
| JP | 2000-280662 A | 10/2000 |
| JP | 2001-312710 A | 11/2001 |

* cited by examiner

*Primary Examiner*—Michael G Lee
*Assistant Examiner*—Ali Sharifzada
(74) *Attorney, Agent, or Firm*—Birch, Stewart, Kolasch & Birch, LLP

(57) ABSTRACT

An information card includes two display panels as a user interface, which constitute a card body, and display visible information constituted by a portrait image and ID information. An internal memory is incorporated in a card body, for storing verification information of that the visible information has been verified externally. Furthermore, a mode selector selectively sets an employee ID card mode or driver license mode. The display panels change over the visible information according to the employee ID card mode or driver license mode. Also, an interface is accessed by a rewriting digital still camera to rewrite the portrait image. The interface receives an encrypted form of the image data from the digital still camera. A microcomputer decrypts the image data.

26 Claims, 8 Drawing Sheets

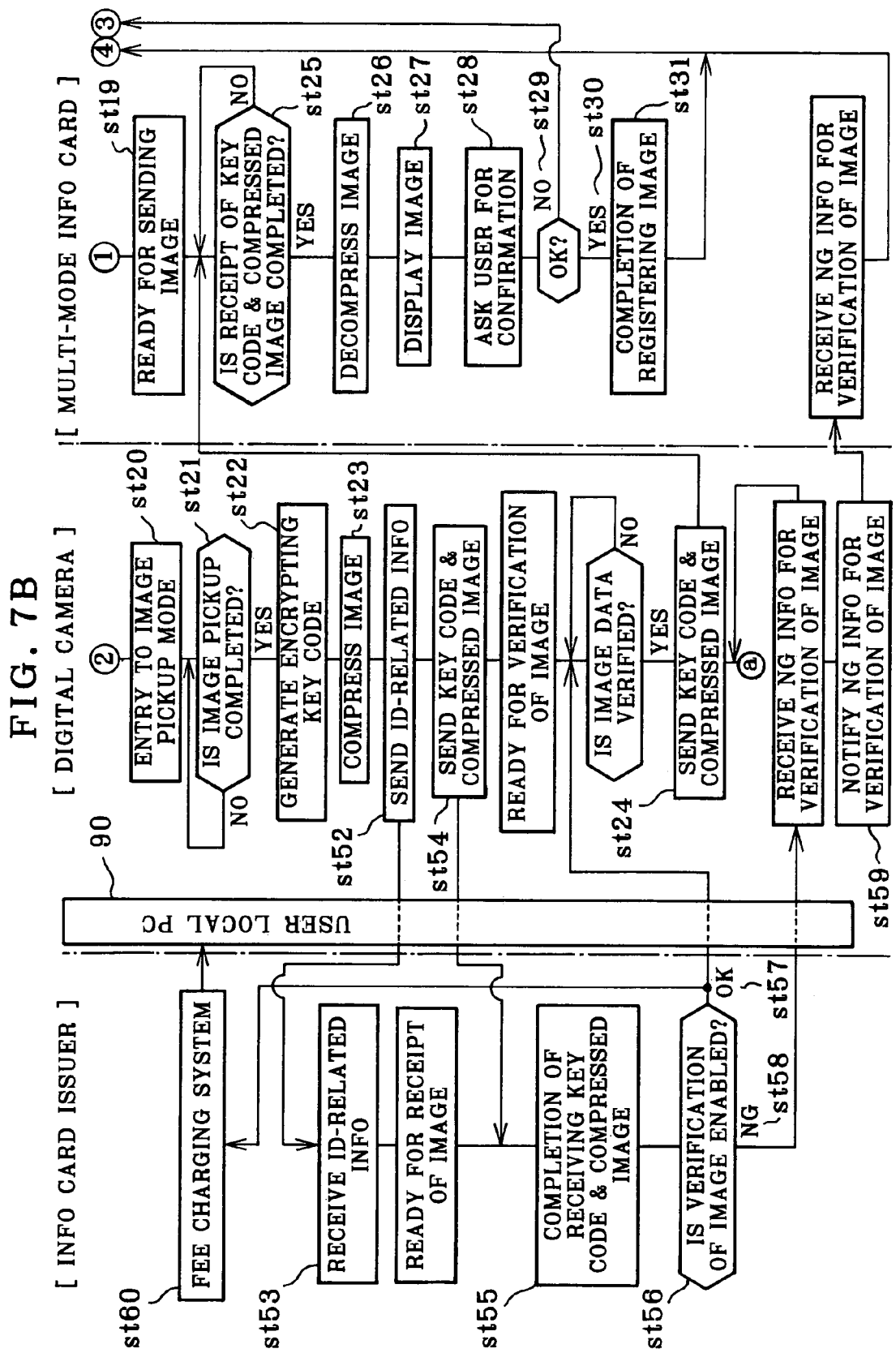

MULTIPLEX INFORMATION CARD, IMAGE DATA INPUTTING EQUIPMENT AND METHOD, AND INFORMATION CARD ISSUING SYSTEM

BACKGROUND OF THE INVENTION

1. Field of the Invention

The present invention relates to a multiplex information card, image data inputting equipment and method, and information card issuing system. More particularly, the present invention relates to an information card which can be suitably structured for in a multiple purpose manner, and can be handled easily, and image data inputting equipment and method and information card issuing system for producing the information card.

2. Description Related to the Prior Art

An ID card as information card having a portrait image is known in such examples of student ID card, employee ID card, driver license and the like. To produce the ID card, a digital still camera is used to photograph appearance of a user. Also, his or her ID information as personal information is input to the digital still camera. Image data of the portrait image and the ID information is written together to a memory card. JP-A 2000-280662 discloses an ID card issuing machine, on which the memory card is set, and which prints the ID card by combining information of the portrait image and ID information associated therewith.

JP-A 2001-312710 discloses an example of the ID card or information card usable as visiting card or name card and in which renewal is possible even upon a change in ID information. In the ID card, there is a rewriting portion disposed on its display surface, and constituted by electronic paper or the like, for displaying the portrait image and the ID information such as a personal history. Also, an IC chip is embedded in the ID card, for storing image data of the portrait image and the ID information. If there occurs a change in the ID information of a user, the ID information in the IC chip is rewritten. This changes indication of the ID information on the rewriting portion.

Also, JP-A 10-283437 discloses an example of the ID card issuing machine characterized in ensuring security by limiting selection of issuance according to a type of the ID card or information card. In the ID card issuing machine, the portrait image of a user, customer or applicant is printed on a plate together with ID information and an ID number, to obtain the ID card. To this end, IC cards with different data are inserted in a printer as multiple sequences for the customer, preservation and maintenance. This is to restrict production of the ID card.

To produce the ID card or information card according to any of JP-A 2000-280662, 2001-312710 and 10-283437, it is necessary for the user to attend a place where an imaging device of the ID card issuing machine is installed for the purpose of issuing or renewing the ID card. This makes it difficult to have the ID card produced for the user. JP-A 2000-280662 discloses the digital still camera for pickup of the portrait image of the person of the ID card as if the digital still camera was a widely available camera. However, a password or ID number is required and input to the digital still camera to identify the user of the ID card. The digital still camera having a ten-key panel for inputting a password is clearly distinct from a widely available camera.

For issuance of the ID card or information card, an ID card issuer or supplier requires devices and apparatuses such as printer for printing the portrait image as well as a photographing device. Also, a great number of attendants or operators are required for the production and issuance. This differs between plural ID card issuers, so a single user is obliged to carry a plurality of ID cards. This causes considerable inconvenience in the use of the ID card in his or her daily life.

JP-A 2000-280662 and 10-283437 have a problem in that the ID card or information card must be abandoned at the time of expiration of the term of validity. There is no idea of reusing the resource provided in the form of the ID card. Also, it is likely that personal appearance of a user remarkably changes and becomes somewhat different from the portrait image even before the expiration of the term. The ID card must be remade by photographing of the portrait image. There remains a problem of the abandonment of used one of the ID card.

SUMMARY OF THE INVENTION

In view of the foregoing problems, an object of the present invention is to provide an information card which can be suitably structured for in a multiple purpose manner, and can be handled easily, and image data inputting equipment and method and information card issuing system for producing the information card.

In order to achieve the above and other objects and advantages of this invention, an information card of a panel form includes an internal memory, incorporated in a card body, for storing at least two sets of information for respectively at least first and second card modes. Each of the sets of the information includes image data of a portrait image, ID information associated with the portrait image, and ID verification information of that a predetermined information card issuer has verified the image data and the ID information. At least one display panel has a display surface on the card body, for displaying the portrait image and/or the ID information.

Furthermore, an externally operable mode selector sets a selected one of the first and second card modes.

Furthermore, a controller controls reading from and writing to the internal memory. An interface is accessed by rewriting external equipment, in order to rewrite the portrait image to the internal memory via the controller.

The interface receives an encrypted form of the image data from the external equipment. The controller decrypts the image data.

Furthermore, a verification input unit, externally operable, inputs the ID verification information for the first or second card mode. The controller checks coincidence of the input ID verification information with the ID verification information, and if the coincidence is detected, enables rewriting of the portrait image of the first or second card mode.

The first or second display panel displays a state of being enabled by the controller.

The ID verification information is a card verification number.

The at least one display panel displays a selection menu pattern. Furthermore, an input unit is externally operable, for selecting rewriting of the portrait image according to the selection menu pattern.

The at least one display panel comprises a first display panel for displaying the portrait image. A second display panel displays the ID information.

Furthermore, an image processing unit processes the image data read from the internal memory, the first display panel being driven in accordance therewith.

The first display panel is larger than the second display panel.

The mode selector, the verification input unit and the input unit are arranged on one surface of the panel form where the display surface is located.

Furthermore, there is a battery chamber for loading of a battery. A battery lid closes the battery chamber openably.

The first card mode is for use of an employee ID card format, and the second card mode is for use of a driver license format.

According to one aspect of the invention, image data inputting equipment or a digital camera for writing to an information card is provided. The information card includes an internal memory, incorporated in a card body, for storing image data and ID information associated with the image data, and at least one display panel, having a display surface on the card body, for displaying an image and/or the ID information. The digital camera comprises an image pickup device for image pickup of a photographed image or card carrier related image of a card carrier of the information card in a state kept connected with the information card. An interface transmits image data of the card carrier related image to the information card.

The image pickup is authorized according to verification by the information card.

Furthermore, a memory stores first verification information. The information card stores second verification information. The verification by the information card is according to checking coincidence between the first and second verification information.

The first and second verification information is a camera verification number having been verified by a predetermined information card issuer.

The verification by the information card is effected at each time that image data of one card carrier related image is input to the information card.

The image data of the card carrier related image is encrypted before being input to the information card.

Furthermore, a memory card slot is adapted to insertion of the memory card, and also has the connection terminal disposed inside, and is adapted to coupling of a connection cable in place of the memory card, for connecting with the information card electrically.

According to another aspect of the invention, an information card issuing system for issuing an information card is provided. The information card includes an internal memory, incorporated in a card body, for storing image data of a portrait image and ID information associated with the portrait image, and at least one display panel, having a display surface on the card body, for displaying the portrait image and/or the ID information. The information card issuing system comprises image data inputting equipment or a digital camera for connecting with the information card electrically in a removable manner, and for inputting image data of the portrait image to the information card while kept in connection therewith electrically.

According to still another aspect of the invention, an information card issuing system for issuing an information card comprises image data inputting equipment or a digital camera, settable in a portrait mode, for connecting with the information card electrically in a removable manner when set in the portrait mode, and for inputting image data of a portrait image to the information card while kept in connection therewith electrically. When the portrait mode is set, the digital camera notifies the information card of a camera verification number according to verification of a predetermined information card issuer in response to request from the information card. The information card checks the camera verification number so as to notify the digital camera of whether the camera verification number is accepted. If the camera verification number is accepted, the digital camera is allowed to pick up a portrait image, and transmits image data of the portrait image to the information card. The information card displays the portrait image on the display panel.

According to another aspect of the invention, an information card issuing system for issuing an information card comprises image data inputting equipment or a digital camera, settable in a portrait mode, for connecting with the information card electrically in a removable manner when set in the portrait mode, and for inputting image data of the portrait image to the information card while kept in connection therewith electrically. A local terminal device connects with the digital camera electrically, and connects with a verification computer of the information card issuer via a network. The local terminal device receives the image data of the portrait image from the digital camera, and transmits the image data to the verification computer via the network. The verification computer notifies the digital camera of information of verifying the portrait image via the network and the local terminal device. In response thereto, the digital camera transmits the image data to the information card. The information card displays the portrait image on the display panel according to the image data.

The verification computer notifies the local terminal device of billing for renewing the portrait image before notifying the image data inputting equipment or a digital camera of having verified the portrait image, and receives notification from the local terminal device for agreement.

According to a further aspect of the invention, an information card includes a user interface for constituting a card body, and for displaying visible information constituted by at least one of a portrait image and ID information. An internal memory is incorporated in a card body, for storing verification information of that the visible information has been verified externally.

Furthermore, a mode selector sets a selected one of first and second card modes. The user interface changes over the visible information according to the selected one of the first and second card modes.

BRIEF DESCRIPTION OF THE DRAWINGS

The above objects and advantages of the present invention will become more apparent from the following detailed description when read in connection with the accompanying drawings, in which:

FIG. 7B is a flow chart illustrating a second half of the sequence of FIG. 7A.

DETAILED DESCRIPTION OF THE PREFERRED EMBODIMENT(S) OF THE PRESENT INVENTION

Figure 1:
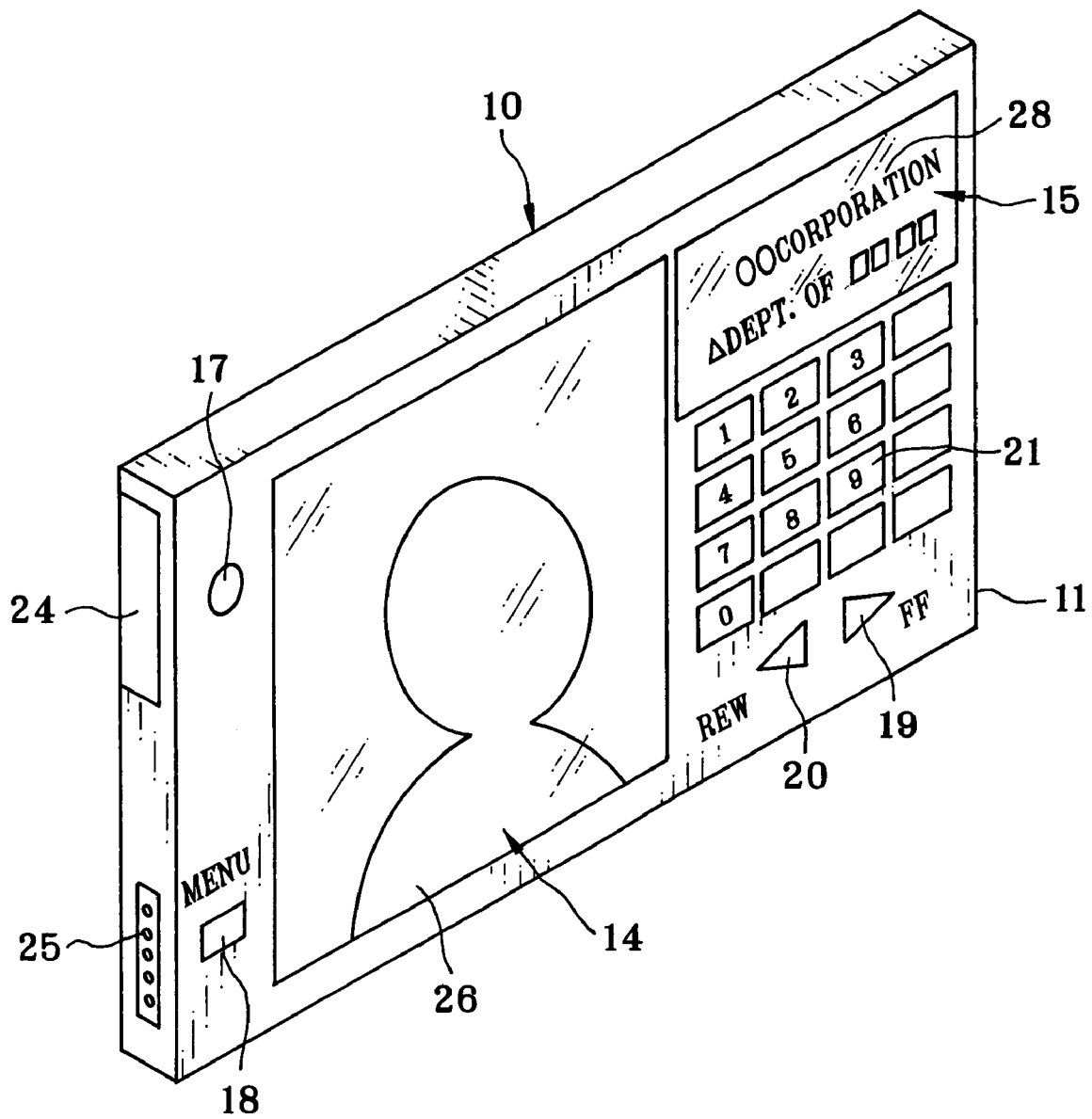
FIG. 1 is a perspective view illustrating an information card.

In FIG. 1, an electronic multi-mode information card or ID card 10 is illustrated, and includes a card body 11 of a quadrilateral shape. A front surface of the card body 11 has a first liquid crystal display (LCD) panel 14, a second liquid crystal display (LCD) panel 15 as user interface, a display button 17, a menu button 18, a forward button 19, a reverse button 20 and a ten-key panel 21. The first LCD panel 14 is a user interface for a card input portrait image. A battery lid 24 is disposed in a left side face, and closes a battery chamber for containing a battery. An input/output interface channel 25 with a connection terminal array is used for connection with a digital still camera, for inputting and outputting image data and the like. Note that a solar cell can be used in place of a battery for being inserted.

The first LCD panel 14 displays a portrait image 26 or portrait photograph of a human face, and other information. The second LCD panel 15 displays the ID information 28 related to the person of the portrait image 26. Examples of the ID information 28 include personal history of the person, name of college, school or other bodies for education, symbol of college or the like, name of firm or other business bodies, symbol of firm or other business bodies, corporate identity (CI) mark, and the like.

Figure 2:
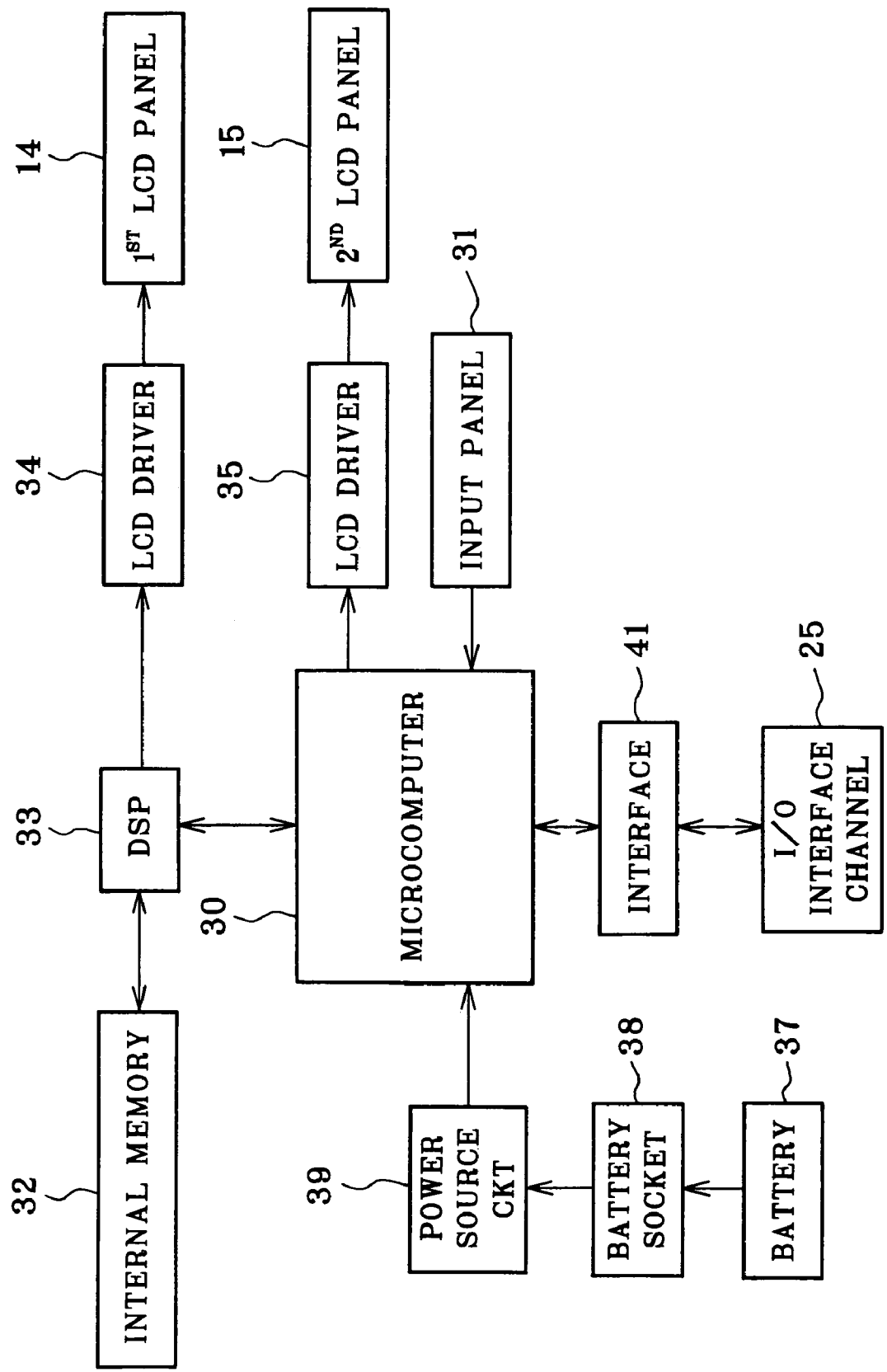
FIG. 2 is a block diagram schematically illustrating elements of circuitry of the information card.

In FIG. 2 for the multi-mode information card 10, an input panel or keypad 31 includes the display button 17, the menu button 18, the forward button 19, the reverse button 20 and the ten-key panel 21. A microcomputer 30 is responsive to inputs of the input panel 31, and controls the whole elements in the information card 10.

An internal memory 32 stores a plurality of sets of information, each of which is constituted by image data of the portrait image 26, the ID information 28, and card verification number, which is determined after authorization of the image data and the ID information 28 by an information card issuer. Any of the card issuers or card issuing agencies determines the card verification number, so it is possible by checking coincidence of the card verification number to renew the ID information 28 associated with the information card issuer and the portrait image 26 according thereto. The internal memory 32 also stores a password for identifying the user. The password must be input by the ten-key panel 21 before the multi-mode information card 10 can be used. The card verification number and the password are not displayed in any of the LCD panels 14 and 15.

A digital signal processor (DSP) 33 subjects the image data to image processing of various functions, for example compression, decompression, encryption and decryption. An LCD driver 34 causes the first LCD panel 14 to display an image according to decompressed image data. An LCD driver 35 causes the second LCD panel 15 to display the ID information 28.

A battery socket 38 is disposed inside the battery chamber. A battery 37 is fitted on and connected with the battery socket 38. A power source circuit 39 is connected with the battery socket 38, and amplifies the power generated by the battery 37, to provide elements of the microcomputer 30 therewith.

After setting the battery 37 on the battery socket 38, standby electric current at a low level is caused constantly to flow in elements of the multi-mode information card 10. The ten-key panel 21 is operated to turn on the power source of the information card 10. Note that when all the elements of the input panel or keypad 31 remain intact for 30 seconds or more without actuation, the power source of the information card 10 is automatically turned off. An interface (I/F) 41 having the input/output interface channel 25 connects with the microcomputer 30, and can input or output image data, and is used for transmission and renewal of the ID information 28.

A use of the multi-mode information card 10 for an employee ID card and driver license is described. In general, the employee ID card is issued by a firm or other business bodies of the user. The driver license is issued by a motor vehicle division of a state in which the user resides, or issued in Japan by a public safety commission of a prefecture where the user lives. At first, a password is input by depressing the ten-key panel 21. The power for the information card 10 is turned on in response to pushing the ten-key panel 21.

The microcomputer 30 allows the LCD panels 14 and 15 to display images upon depression of the display button 17 after login, only if the input password coincides with stored password in the internal memory 32. If the input password entered by use of the ten-key panel 21 is different from the stored password, then the LCD panels 14 and 15 are disabled from displaying images even when the display button 17 is depressed.

The display button 17 is depressed after entry of a correct password. The first LCD panel 14 displays the portrait image 26 of the owner of the multi-mode information card 10. The second LCD panel 15, if the information card 10 is used as an employee ID card, displays a personal name, firm name, employee number, firm symbol and the like. If the information card 10 is used as a driver license, the ID information 28 is displayed on the second LCD panel 15, including an address, personal name, date of issue, date of expiration, license number and the like.

The changeover between the employee ID card and the driver license is according to depression of the forward button 19 or the reverse button 20. The portrait image 26 or portrait photographs associated with the ID information 28, so data of the relationship is stored in the internal memory 32. Note that the same portrait may be used for both of the employee ID card and the driver license. Alternatively, two portraits may be discretely used for the employee ID card and the driver license. For example, a portrait for the driver license may be produced at a different date from that of a portrait for the employee ID card. Furthermore, a first portrait for the employee ID card may be a picture of a human face without eyeglasses in contrast with a second portrait for the driver license with a picture of a human face with wearing eyeglasses.

When the menu button 18 is depressed, a selection menu is displayed on the first LCD panel 14, for a user to determine and edit various items. If rewriting of the ID information 28 of the employee ID card is desired, at first the portrait image 26 to be rewritten is displayed on the first LCD panel 14 of the multi-mode information card 10. Then the ID information 28 related to this is displayed on the second LCD panel 15. Then the menu button 18 is depressed, so the first LCD panel 14 displays the selection menu. The user selects and inputs REWRITING OF ID INFORMATION. The ten-key panel 21 is depressed to input a card verification number of the employee ID card.

If the input card verification number coincides with the card verification number stored in the internal memory 32, then the first LCD panel 14 is caused to display a message informing that rewriting of the ID information 28 is enabled for the employee ID information, for example ID INFO IS REWRITABLE. After this, the ID information 28 is written through the input/output interface channel 25 of the interface 41 by specialized rewriting equipment of the business body issuing the employee ID card. Note that the ID information 28 may be rewritten by the user with subsequent confirmation of the firm, but also can be written by an operator administering ID in the firm.

Accordingly, the multi-mode information card of the invention makes it possible for a user not to carry plural information cards at one time. Portability of information cards can be higher. Handling of information cards can be simplified. Also, reuse of the information card is possible.

Figure 3:
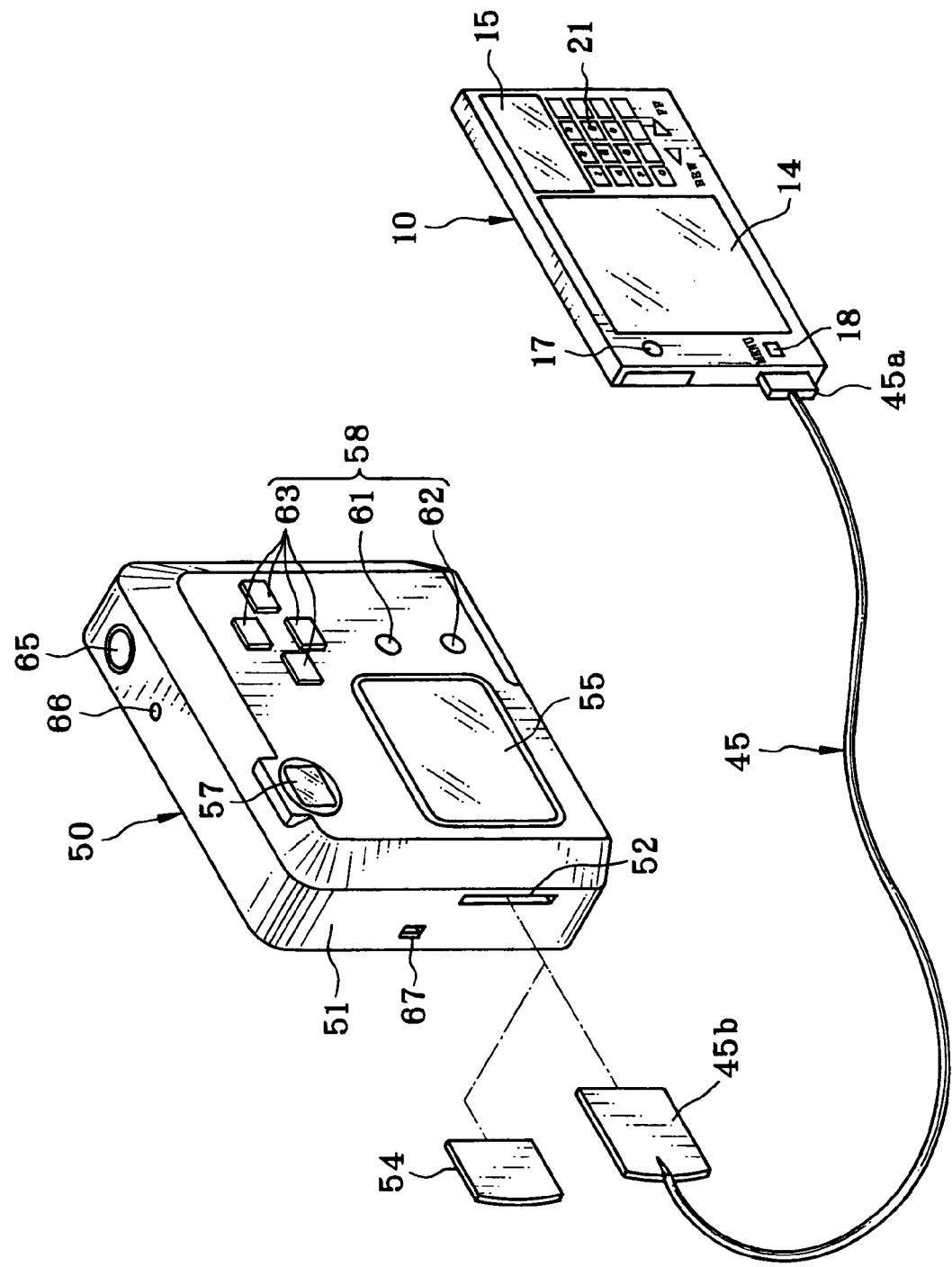
FIG. 3 is a perspective view illustrating a state of connection of the information care with a digital still camera.

A change of the portrait by the user himself or herself is described next. In FIG. 3, a digital still camera 50 for image pickup is used. A first connector 45a of a connection cable 45 is connected with the input/output interface channel 25 of the multi-mode information card 10. A second connector 45b of the same is inserted in a memory card slot 52 having a connection terminal in the digital still camera 50. A connection socket 53 or a connection terminal disposed inside becomes connected with the second connector 45b. See FIG. 4. Note that in a normal operation of the digital still camera 50, a memory card 54 is inserted in the card slot 52. When the second connector 45b is set, its setting is in place of setting of the memory card 54.

A camera body 51 is included in the digital still camera 50. A liquid crystal display (LCD) panel 55 as user interface is disposed in the rear of the camera body 51, and displays an image or various menus. Also, an electronic viewfinder (EVF) 57 constitutes a user interface in the rear of the camera body 51. An input panel 58 in the rear of the camera body 51 is used to input various signals for conditioning the use of the digital still camera 50.

The input panel 58 includes a menu/confirmation button 61, a cancellation button 62, and a cross-shaped button group 63. The menu/confirmation button 61 is depressible to display a mode setting menu on the LCD panel 55, and also to confirm or execute a selected control. The cross-shaped button group 63 is used as a cursor key at the time of the mode setting menu, as a zoom button at the time of image pickup, and a mode selector for selection of modes.

A shutter release button 65 protrudes from the top of the camera body 51. A self-timer button 66 on an upper face of the camera body 51 is depressible for photography of a self-portrait. A USB (Universal Serial Bus) connector 67 or a USB port is disposed in a lateral face of the camera body 51 in addition to the memory card slot 52.

Figure 4:
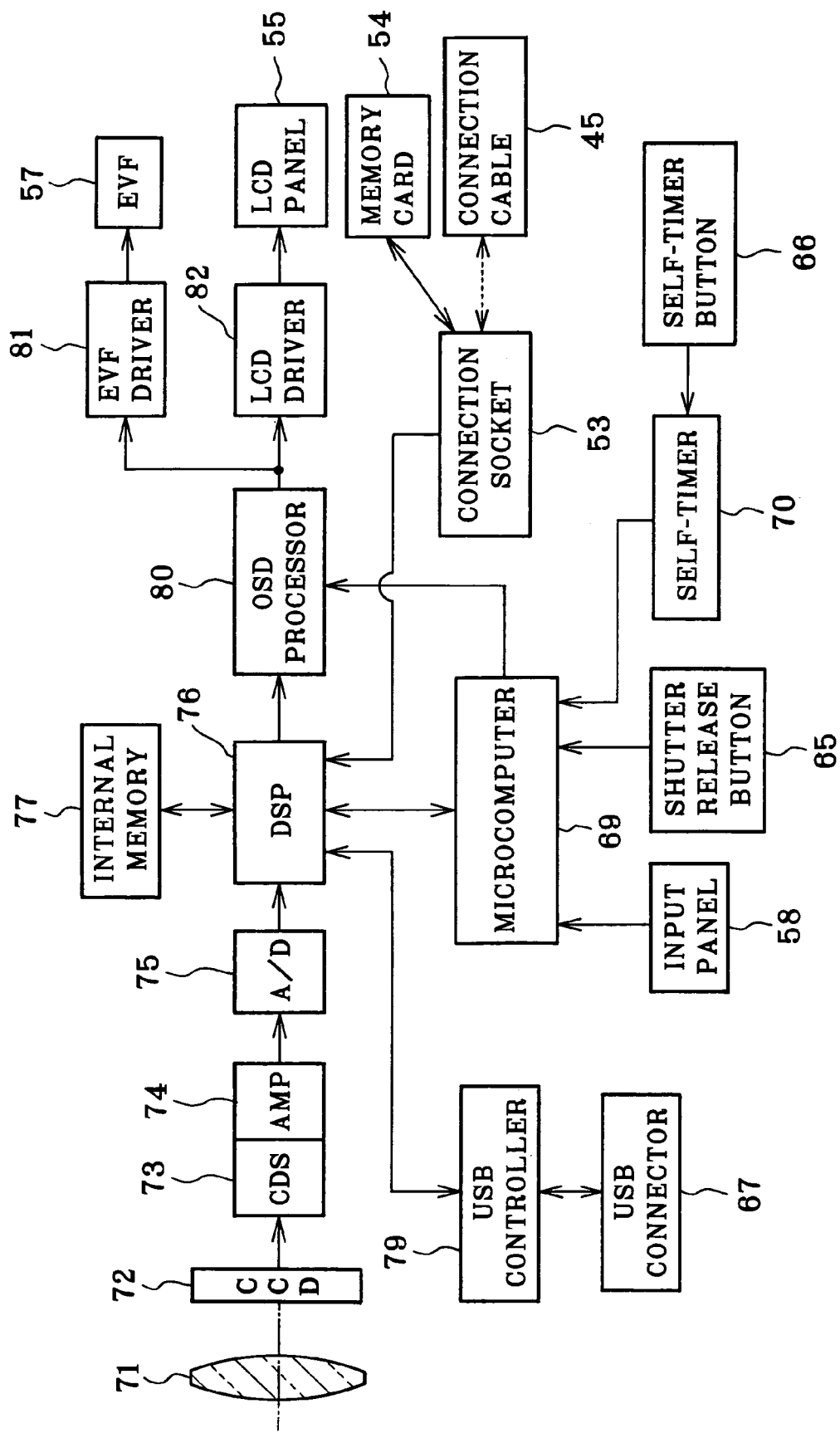
FIG. 4 is a block diagram schematically illustrating elements of circuitry of the digital still camera.

In FIG. 4, elements of circuitry in the digital still camera 50 are illustrated. A self-timer 70 generates a releasing signal in a manner of the releasing signal according to the shutter release button 65. A microcomputer 69 controls the elements in the digital still camera 50 according to operation signals from the input panel 58, or the releasing signal from the shutter release button 65 or the self-timer 70. The self-timer 70 is started up by depression of the self-timer button 66, and outputs the releasing signal upon the lapse of 10 seconds after the depression to send it to the microcomputer 69.

A CCD (charge coupled device) 72 is disposed behind an image pickup lens 71. When the image pickup lens 71 is focused for a photographic object, an object image is sharply formed on a focal plane where a photoelectric surface of the CCD 72 lies. The CCD 72 outputs an image pickup signal by photoelectrically converting the object image to an electric signal. A correlated double sampling circuit (CDS) 73 is provided with the image pickup signal.

The correlated double sampling circuit 73 eliminates electric noise from the image pickup signal of an analog form. An amplifier 74 amplifies the image pickup signal. An A/D converter 75 converts the image pickup signal into digital image data of a digital signal. A digital signal processor (DSP) 76 is provided with the image data obtained by the A/D conversion.

The microcomputer 69 controls the DSP 76. When a releasing signal is received from the shutter release button 65 or the self-timer 70 by the microcomputer 69, image data of this instant is written to an internal memory 77 in the case of the portrait mode or card input mode. Note that the image data is written to the memory card 54 in case of the image pickup mode in contrast with the portrait mode.

A camera verification number is stored in the internal memory 77 in addition to image data. The camera verification number is information of confirming that the digital still camera 50 is registered as portrait producing camera by an information card issuer for administration. The camera verification number is input by a personal computer into the USB connector 67, transmitted by a USB (Universal Serial Bus) controller 79 and the DSP 76, and written to the internal memory 77.

An OSD (on-screen display) processor 80 receives image data after being processed in the DSP 76 for compression, decompression, encryption and the like. The OSD processor 80 adjusts and determines various parameters for the image data for each of the LCD panel 55 and the electronic viewfinder 57, the parameters including positions within a frame, brightness, color balance, contrast and the like. In the case of image pickup mode or movie photographing mode, an EVF driver 81 is provided with image data of a live image. In the case of playback mode, an LCD driver 82 is provided with the image data read from the memory card 54 or the internal memory 77. The EVF driver 81 drives the electronic viewfinder 57. The LCD driver 82 drives the LCD panel 55.

Figure 5:
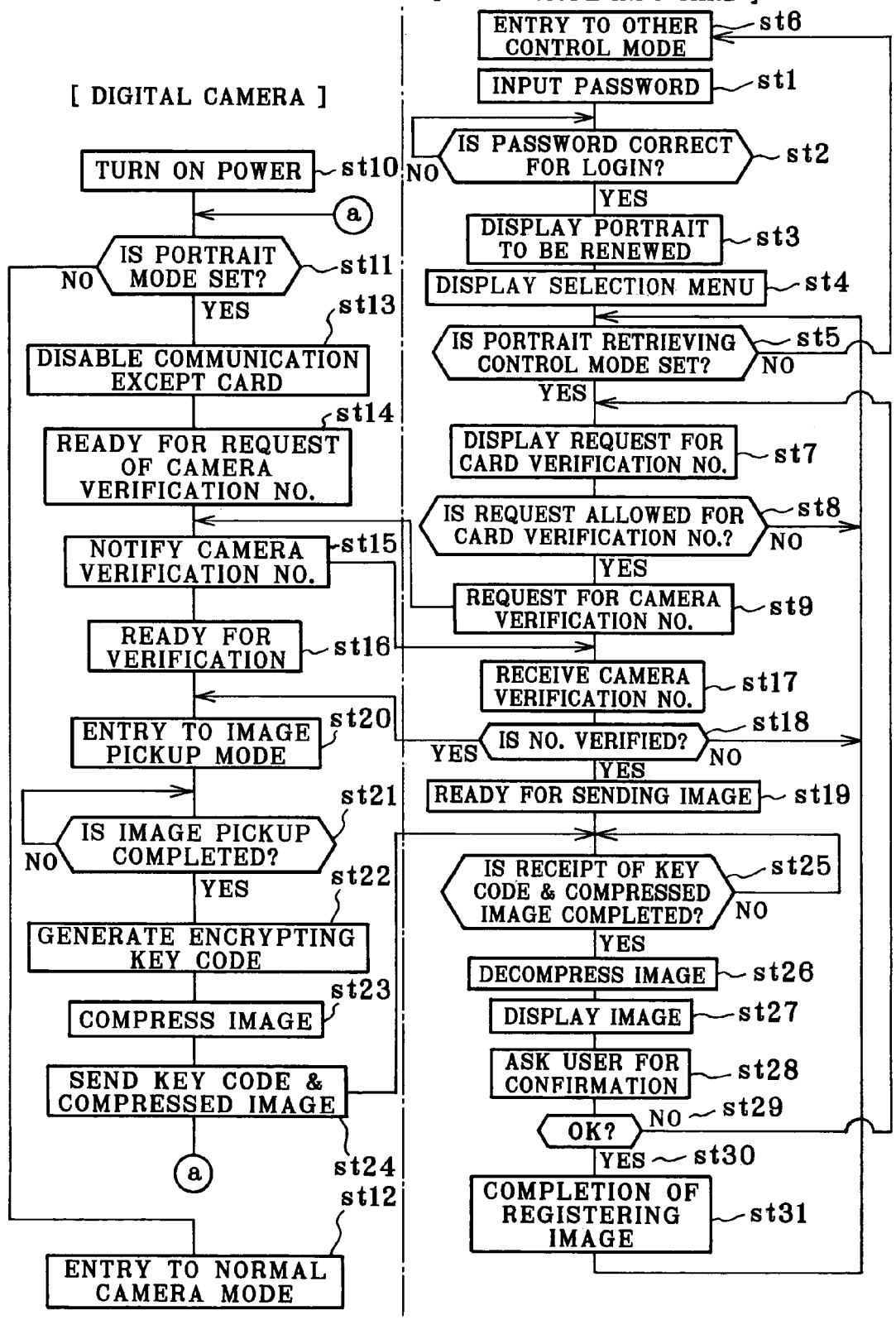
FIG. 5 is a flow chart illustrating a sequence of renewing a portrait image by image pickup in the digital still camera.

An operation or sequence of changing the portrait image 26 or portrait photograph is described by referring to FIG. 5. At first, a camera verification number is previously stored in each of the multi-mode information card 10 and the digital still camera 50. Also, the information card 10 is connected to the digital still camera 50 by the connection cable 45.

In the first step st1, a password is input by use of the ten-key panel 21. If the password is correct in the step st2, login is successful. The use of the multi-mode information card 10 is allowed. In the step st3, the display button 17 is depressed so the portrait image 26 to be renewed is displayed on the first LCD panel 14 of the information card 10. The ID information 28 related to this is displayed on the second LCD panel 15. Then the menu button 18 is depressed. In the step st4, a selection menu is displayed on the first LCD panel 14. In the step st5, the portrait retrieving control mode is set in the information card 10. If other control modes of the information card 10 are selected other than the portrait retrieving control mode, then the control of the information card 10 comes to other control mode in the step st6.

When the portrait retrieving control mode is selected, a message of ENTER YOUR CARD VERIFICATION NO. in the step st7 to encourage a user to input the card verification number. The user inputs the card verification number of his or her employee ID card by pushing the ten-key panel 21. The microcomputer 30, in turn, reads the second card verification number from the internal memory 32 where the number is previously stored, and checks coincidence of the first card verification number with the second in the step st8. If lack of the coincidence is detected as an NG result, then the access of the user is regarded as unacceptable or fraudulent, so the control returns to the initial indicating state of the selection menu. If the coincidence is detected appropriately, then entry of the camera verification number is requested of the digital still camera 50. See the step st9.

In the step st10, the power for the digital still camera 50 is turned on. In the step st11, the portrait mode or card input mode is set. If modes other than the portrait mode are selected, a normal camera mode is set. See the step st12. In the portrait mode, transmission of image data to devices other than the multi-mode information card 10 is inhibited in the step st13. In the step st14, the digital still camera 50 stands ready for a request signal of the camera verification number from the information card 10. Also, parameters are determined for the portrait mode, including an image size, ratio of compression, format, and the like.

The microcomputer 69 in the digital still camera 50 receives a signal of the request of the camera verification number from the multi-mode information card 10. In response, the microcomputer 69 notifies the camera verification number to the information card 10. See the step st15. The digital still camera 50 stands by for verification.

The microcomputer 30 of the multi-mode information card 10 receives the camera verification number from the digital still camera 50 in the step st17. The microcomputer 30 checks coincidence of the same with a stored camera verification number in the internal memory 32. In the case of an NG result or lack of the coincidence, then the digital still camera 50 is determined as different from a portrait photographing camera. Then the selection menu becomes displayed again. If the coincidence is detected, then the digital still camera 50 is provided with the result of the coincidence. The digital still camera 50 becomes ready for receiving image data in the step st19.

The digital still camera 50 receives the information of the coincidence, and then starts operation of the image pickup mode in the step st20. After this, a user depresses the self-timer button 66, or has somebody depress the shutter release button 65, to produce a self-portrait. In the step st21, completion of the image pickup is checked. The image data is written to the internal memory 77. In the step st22, the DSP 76 generates an encrypting key code in a random manner. In the step st23, the image data is converted to compress image data of the JPEG format according to the encrypting key code.

The self-timer 70 drives the DSP 76. In the step st24, the key code and the compressed image data are sent to the multi-mode information card 10 by means of the connection socket 53 and the connection cable 45. Then the digital still camera 50 comes to the initial state of immediately after the turning on of the power. Note that, if no releasing signal enters the self-timer 70 even upon lapse of a prescribed time after the return to the image pickup mode, then the digital still camera 50 returns to the initial state.

In the step st25, the multi-mode information card 10 receives the key code and the compressed image data. Then in the step st26, image data is decompressed according to the key code. In the step st27, the image is displayed on the first LCD panel 14. In the step st28, asking the user for confirmation is displayed on the second LCD panel 15.

If the user does not confirm in response to the asking, he or she depresses zero (0) in the ten-key panel 21 in the step st29. If the user confirms, then one (1) in the ten-key panel 21 is depressed in the step st30. Registration of an image is completed in the step st31. The multi-mode information card 10 returns to the selection menu. If no receipt of a key code or compressed image data occurs even upon lapse of a prescribed time after an OK result in the step st18, an image displayed on the information card 10 returns to the selection menu.

In the registration of the image, new image data is written to the internal memory 32 in an overwritten manner in place of the older image data for the employee ID card. Note that image data of other portraits of an information card issuer are kept stored without overwriting, for example image data of a portrait in compliance with rules of the motor vehicle division.

Registration of an image to the information card issuer after writing a photographed portrait image 26 to the multi-mode information card 10 is described now. The input/output interface channel 25 is used for connecting the information card 10 with a personal computer. The portrait image 26 is transmitted to the information card issuer. To this end, the information card issuer notifies the card verification number to the information card 10, to enable reading of image data from the internal memory 32. Then the information card issuer reads image data. Namely, authorization is required for a user to enable reading of image data in the information card 10.

Figure 6:
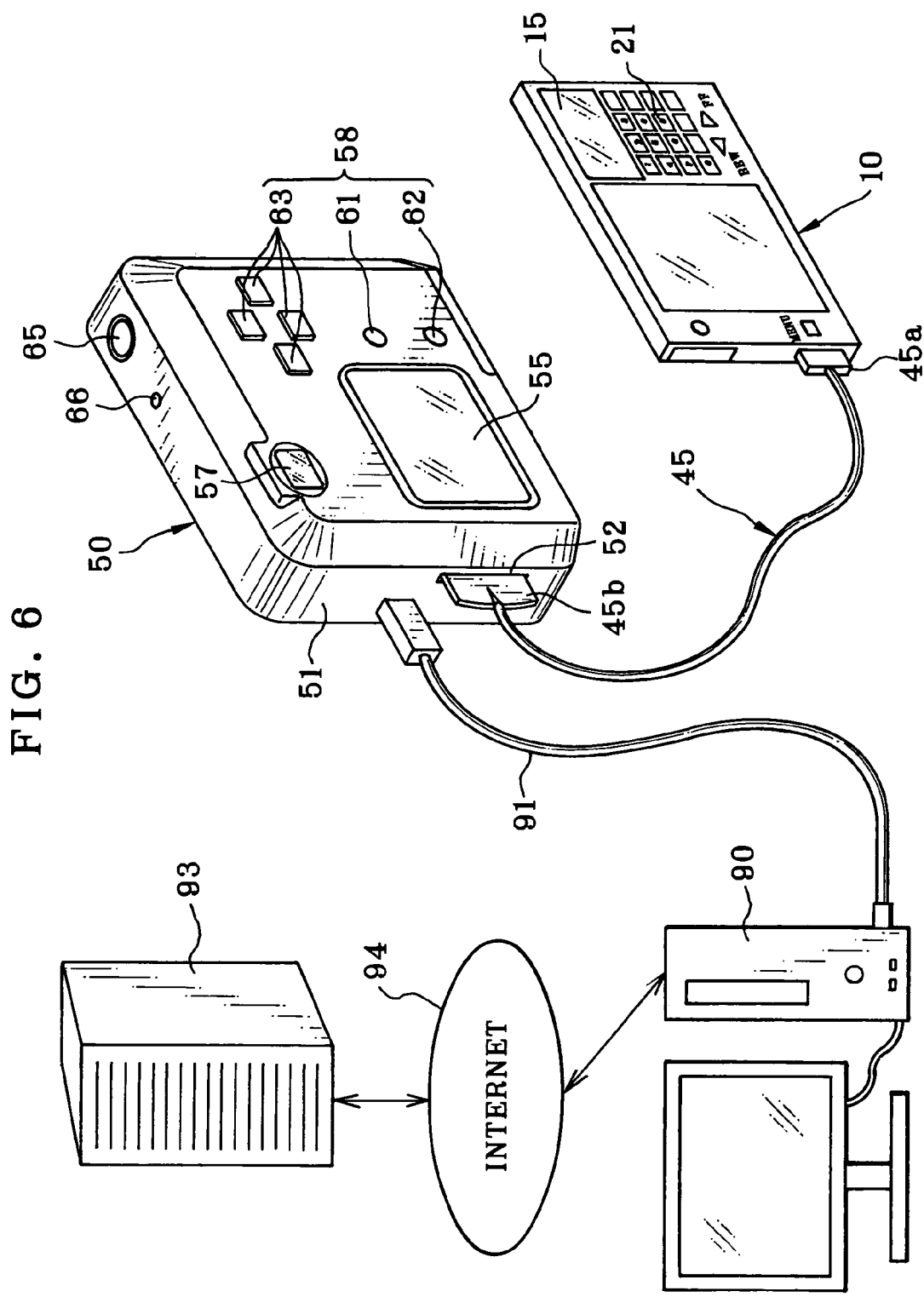
FIG. 6 is a perspective view illustrating a state of connection of the information card with the server computer of the card issuer by means of the various devices.

Now, description of one embodiment of the invention is made, to refer to a method of acquiring authorization of an information card issuer. A personal computer or server is used where communication with the information card issuer is made. In FIG. 6, the multi-mode information card 10 is connected to the digital still camera 50 in the above-described manner. A local terminal device 90 or a personal computer is connected with the digital still camera 50 by means of a USB (Universal Serial Bus) cable 91. A server computer 93 as verification computer of the information card issuer is connected with the local terminal device 90 by means of the Internet 94 as network.

Figure 7A:
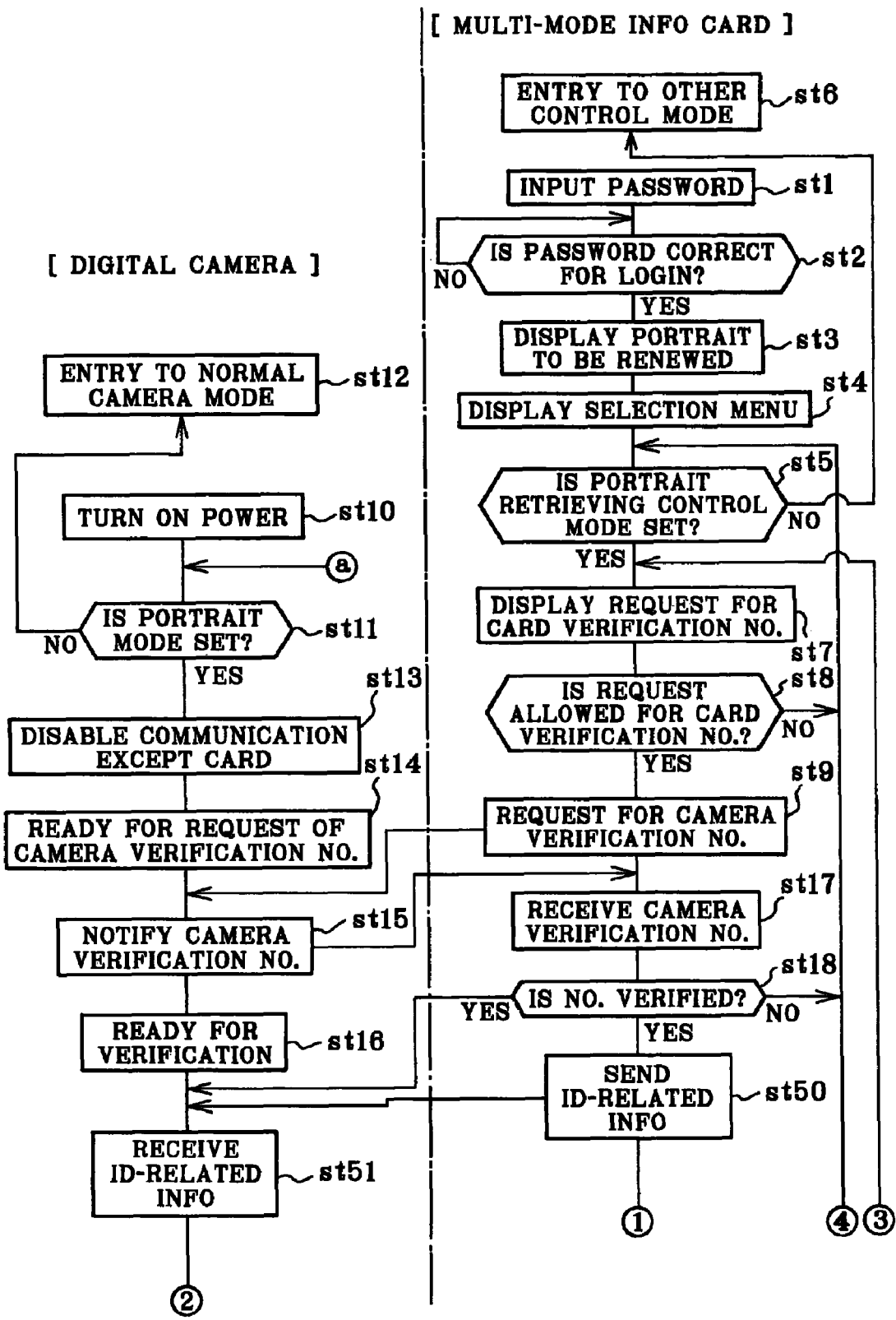
FIG. 7A is a flow chart illustrating a first half of a sequence of acquiring acceptance of an information card issuer.

Operation of the embodiment is described by referring to a flow in FIG. 7. Respective steps in the sequence similar to those of FIG. 5 are designated with identical reference signs. If the number is verified in the step st18, then ID-related information produced by the information card issuer and stored in the multi-mode information card 10 is transmitted by the digital still camera 50 and the local terminal device 90 to the server 93 of the information card issuer. See the steps st50-st53. The transmission is controlled after the compression of the image data later than the image pickup. After this, the digital still camera 50 outputs the encrypting key code and compressed image data in the step st54. Those are received by the server 93 of the information card issuer in the step st55. Note that examples of the ID-related information are card types, serial number, software version, memory capacity and the like of the information card 10.

It is checked in the information card issuer whether a change of the portrait of the image data is allowed or not by evaluating the image data. See the step st56. If the change is allowed, then the allowance is notified to the digital still camera 50 in the step st57. In the step st24, the digital still camera 50 sends the key code and the compressed image data to the multi-mode information card 10. Note that in the information card issuer, the verified image data is stored. Furthermore, it is possible to renew the ID-related information according to the image data, and transmit the ID information 28 to the information card 10 again.

If the verification of image is not enabled in the step st56, then NG information is notified to the digital still camera 50 in the step st58. At the same time, an error message is displayed on a panel of the local terminal device 90 by outputting information of the error. The digital still camera 50 notifies NG information to the information card 10 for the NG state of the verification of image data. Upon receiving the NG information, both of the information card 10 and the digital still camera 50 return to the initial state. The information card 10 displays the selection menu. The digital still camera 50 stands by in the state of immediately upon turning on the power.

As described heretofore, image data of only the portrait authorized by the information card issuer can be written to the information card 10. Also, charging of fee occurs when the verification is confirmed. The system notifies the charging of fee to the local terminal device 90 at the user in the step st60. Note that the time of fee charging step in the sequence may be modified. For example, at first, the verification is confirmed. Then confirmation is notified to the local terminal device 90 at the user. If the user sends yes information by approving the fee charging or billing, a signal of allowing the fee charging is generated. Alternatively, the fee charging can be made immediately after transmission of image data from the user.

According to the present system, it is possible for a user to renew the portrait image 26 in the multi-mode information card 10 at home physically in an unattended state of the information card issuer. Furthermore, the information card issuer does not require devices for photographing and printing to produce a card. A cost for the renewal of the information card 10 can be reduced.

In spite of the above-described two liquid crystal display panels in the information card 10, it is possible in the invention for the information card 10 to have a single display panel as user interface. A portrait and the ID information 28 may be displayed on the display panel either simultaneously or alternately by selective operation. Also, the information card 10 may be provided with a power switch additionally. Furthermore, a graphic user interface of the information card 10 may be other than a liquid crystal display panel, and can be, for example, electronic paper and the like.

It is noted that a solar cell can be used for electrically changing the inner battery of the card, as disclosed in U.S. Pat. No. 5,777,903. Also, the multi-mode information card can be an IC card of a non-contact type, to enable transmission of image data, the ID information 28 and the like. This makes it possible to construct the multi-mode information card in a manner compatible with an electronic pass for a passenger to use on the railroad of which ticket inspection is automated. A card according to the invention can have an IC memory or tag, which can be moved to contact an information reader of a ticket inspecting machine, so that the passenger can pass through a gate of the ticket inspection.

In the above embodiment, the use of the login password is necessary. However, the protection with the password can be eliminated. In the above embodiment, the information card 10 is a combined card of the employee ID card and driver license. However, the information card 10 may be a dual card for any of plural purposes.

In the above embodiment, the information card is a storage medium having the display panels. The LCD panels 14 and 15 are secured locally to the card body 11. However, the card body 11 may not be used. An information card of the invention can be a memory built-in display device of which the LCD panel 14 can be the principal element. It is preferable in such an example that a recess or the like is formed in a portion of the periphery of the LCD panel 14 for the purpose of securing parts of circuitry.

The use of the USB connector 67 is additionally described. In general, the USB connector 67 is used for inputting and outputting image data or the like in connection with a personal computer or other terminal devices. However, the USB connector 67 is controlled and inhibited from being used for transmission of image data while the digital still camera 50 operates for picking up the portrait image 26 which constitutes a card input portrait image.

In operation of the digital still camera 50, the initial state returns each time that pickup of an image is completed. See the step st24. This is a feature capable of keeping securing of the data of the image.

It is furthermore preferable for the microcomputer to control exclusive inputting of image data to the information card 10 by inhibiting image data from being input to media other than the information card 10. Also, an additional connector for the connection cable may be disposed beside the memory card slot.

Furthermore, the digital still camera 50 can be connected with the information card 10 by any suitable connecting techniques other the connection cable, for example, infrared transmission, Bluetooth (trade name) system, and the like. Also, the digital still camera 50 can be provided with a compatible connection terminal in a manner of a known PC card slot. The IC card or the information card 10 can be inserted in the slot of the connection terminal. This enables omission of the connection cable.

In the above embodiment, the information card 10 is a dual purpose article. However, a system of inputting data according to the invention may be used with a single purpose card, for example a driver license without selective images.

In the above embodiment, the second portrait image is written in place of the first portrait image initially stored in the multi-mode information card 10. However, it is possible to pick up a first portrait image in the digital still camera 50. To this end, at first the camera verification number is created by the information card issuer. The camera verification number is registered in the digital still camera 50, so that the first portrait image can be produced and stored.

In the above embodiment, verifying the camera verification number is effected directly before the image pickup mode is set. However, an extra step may be added after the confirmation of verification, in order to check the unchanged connected status of the connection cable. This is preferable for the purpose of keeping security.

Instead of the digital still camera 50 for image pickup and for inputting image data, a digital camera of the invention may be a cellular telephone or mobile telephone in which a camera is built in.

Furthermore, a network for transmission and receipt of data may be intranet in place of the Internet 94. The local terminal device 90 may be PDA or other suitable electronic equipment in place of a personal computer.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A multiplex information card comprising:
a card body;
an internal memory, incorporated in said card body, for storing at least two sets of information for respectively at least first and second card modes;
an interface for being accessed by a controller for controlling reading from and writing to said internal memory for managing image capturing equipment, in order to rewrite a portrait image to said internal memory via said controller, and said information card has a portrait retrieving control mode, and rewriting said portrait image is allowed when said portrait retrieving control mode is set; and at least one display panel for displaying said portrait image and/or ID information associated with said portrait image;

wherein each of said sets of said information includes image data of said portrait image, said ID information, and ID verification information of that a predetermined information card issuer has verified said image data and said ID information, and wherein said portrait image is rewritten by a portrait image newly verified by said predetermined information card issuer; and wherein a camera verification number is stored in said image capturing equipment, and said camera verification number has been verified by said predetermined information card issuer.

2. An information card as defined in claim 1, further comprising a mode selector for setting a selected one of said first and second card modes.

3. An information card as defined in claim 1, wherein said interface receives an encrypted form of said image data from said image capturing equipment, and said controller decrypts said image data.

4. An information card as defined in claim 2, further comprising a verification input unit for inputting said ID verification information for said first or second card mode; and wherein said controller checks coincidence of said input ID verification information with said ID verification information, and if said coincidence is detected, enables rewriting of said portrait image of one of said first and second card modes.

5. An information card as defined in claim 4, wherein said display panel displays a state of being enabled by said controller.

6. An information card as defined in claim 4, wherein said ID verification information is a card verification number.

7. An information card as defined in claim 4, wherein said at least one display panel displays a selection menu pattern;

further comprising an input unit for selecting rewriting of said portrait image according to said selection menu pattern.

8. An information card as defined in claim 4, wherein said at least one display panel comprises:

a first display panel for displaying said portrait image; and a second display panel for displaying said ID information.

9. An information card as defined in claim 8, further comprising an image processing unit for processing said image data read from said internal memory.

10. An information card as defined in claim 9, wherein said first display panel is larger than said second display panel.

11. An information card as defined in claim 1, wherein said first card mode is for use of an employee ID card format, and said second card mode is for use of a driver license format.

12. Image data inputting equipment for image inputting to an information card, wherein:

said information card includes an internal memory for storing image data and ID information associated with said image data, and at least one display panel for displaying an image and/or said ID information;

said image data inputting equipment comprising:

an image capture device for image pickup of a card carrier related image of a card carrier of said information card in a state kept connected with said information card; and an interface for transmitting image data of said card carrier related image to said information card;

wherein said information card has a portrait retrieving control mode, and rewriting said portrait image is allowed when said portrait retrieving control mode is set, and wherein said portrait image is rewritten by a portrait image newly verified by a predetermined information card issuer; and wherein a camera verification number is stored in said image data inputting equipment, and said camera verification number has been verified by said predetermined information card issuer.

13. Image data inputting equipment as defined in claim 12, wherein said image pickup is authorized according to verification by said information card.

14. Image data inputting equipment as defined in claim 13, further comprising a memory for storing first verification information;

wherein said information card stores second verification information, and said verification by said information card is according to checking coincidence between said first and second verification information.

15. Image data inputting equipment as defined in claim 14, wherein said first and second verification information is a camera verification number having been verified by a predetermined information card issuer.

16. Image data inputting equipment as defined in claim 15, wherein said verification by said information card is effected at each time that image data is input to said information card.

17. Image data inputting equipment as defined in claim 16, wherein said image data is encrypted before being input to said information card.

18. Image data inputting equipment as defined in claim 17, further comprising a memory card slot, adapted to insertion of a memory card, and also having said connection terminal disposed inside, and adapted to coupling of a connection cable in place of said memory card, for connecting with said information card electrically.

19. Image data inputting equipment as defined in claim 12, wherein said image data inputting equipment is a digital camera.

20. An information card issuing system for issuing an information card, wherein:

said information card including an internal memory for storing image data of a portrait image and ID information associated with said portrait image, and at least one display panel for displaying said portrait image and/or said ID information;

said information card issuing system comprising:

image data inputting equipment, including an image capture device for image capture of a card carrier related image of a card carrier of said information card in a state kept connected with said information card; and an interface for transmitting image data of said card carrier related image to said information card;

wherein said information card has a portrait retrieving control mode, and rewriting said portrait image is allowed when said portrait retrieving control mode is set, and wherein said portrait image is rewritten by a portrait image newly verified by a predetermined information card issuer; and wherein a camera verification number is stored in said image data inputting equipment, and said camera verification number has been verified by said predetermined information card issuer.

21. An information card issuing system as defined in claim 20, wherein said image data is encrypted before being transmitted, and is decrypted after being received.

22. An information card issuing system as defined in claim 21, wherein said image data inputting equipment further includes a memory card slot adapted to insertion of a connection cable in place of a memory card in connection with said information card.

23. An image data inputting method of image inputting to an information card, wherein:
- said information card including an internal memory for storing image data of a portrait image and ID information associated with said portrait image, at least one display panel for displaying said portrait image and/or said ID information, and a portrait retrieving control mode, wherein rewriting said portrait image is allowed when said portrait retrieving control mode is set;
- said image data inputting method comprising steps of:
- notifying said information card of a camera verification number by image data capturing equipment according to verification of a predetermined information card issuer in response to request from said information card;
- wherein the image data capturing equipment is a digital camera;
- checking said camera verification number in said information card so as to notify said image data capturing equipment of whether said camera verification number is accepted;
- if said camera verification number is accepted, allowing said image data capturing equipment to pick up a portrait image and transmit image data of said portrait image to said information card; and
- displaying said portrait image on said display panel according to said image data, and
- wherein said portrait image is rewritten by a portrait image newly verified by said predetermined information card issuer.

24. An image data inputting method of image inputting to an information card, wherein:
- said information card including an internal memory for storing image data of a portrait image, ID information associated with said portrait image, and ID verification information of that a predetermined information card issuer has verified said image data and said ID information, at least one display panel for displaying said portrait image and/or said ID information, and a portrait retrieving control mode, wherein rewriting said portrait image is allowed when said portrait retrieving control mode is set;
- said image data inputting method comprising steps of:
- transmitting said image data of said portrait image from image data capturing equipment, and transmits said image data to a verification computer of said information card issuer via a local terminal device and a network;
- notifying said image data capturing equipment of information of verifying said portrait image by said verification computer via said network and said local terminal device;
- in response thereto, transmitting said image data to said information card from said image data capturing equipment;
- displaying said portrait image on said display panel, and
- wherein said portrait image is rewritten by a portrait image newly verified by said predetermined information card issuer, and
- wherein a camera verification number is stored in said image capturing equipment, and said camera verification number has been verified by said predetermined information card issuer.

25. An image data inputting method as defined in claim 24, further comprising steps of:
- notifying said local terminal device of billing in said verification computer for renewing said portrait image before notifying said image data inputting equipment of having verified said portrait image;
- transmitting notification from said local terminal device to said verification computer for agreement.

26. An image data inputting method as defined in claim 23, wherein a camera verification number is stored in said image capturing equipment, and said camera verification number has been verified by said predetermined information card issuer.

* * * * *